United States Patent Office 3,202,637
Patented Aug. 24, 1965

3,202,637
OIL ADDITIVES AND LUBE OILS CONTAINING THEM
Sidney R. Epton and John Hughes, Wirral, and Joseph M. Soesan, London, England, assignors to Shell Oil Company, New York, N.Y., a corporation of Delaware
No Drawing. Filed Sept. 26, 1963, Ser. No. 311,655
Claims priority, application Great Britain, May 28, 1959, 18,203/59
8 Claims. (Cl. 260—77.5)

The invention relates to new and improved oil-soluble non-ash forming nitro-aromatic telomeric polymers and their preparation.

In the field of lubrication non-ash forming polymers possessing detergent and other desirable lubricating oil properties are particularly desired.

It has now been found that salts of oil-soluble polymeric amines and N-substituted carbamic acids, preferably dithiocarbamic acids,

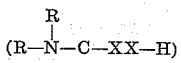

(R—N—C—XX—H)

where at least one of the R's is a hydrocarbyl radical or both R's can be the same or different hydrocarbyl radicals, preferably alkyl, aralkyl, aryl or cycloalkyl radicals of from 1 to 12, preferably 3 to 8 carbon atoms and the X's may be oxygen and/or sulfur, preferably both X's being sulfur, are excellent for improving the lubricating properties of oils.

By the term "polymeric amine" herein is meant a polymer including copolymers, containing basic nitrogen-containing groups, which may be derived from polymerizable monomers containing primary, secondary or tertiary (the latter two are preferred) amino nitrogen, including basic heterocyclic amino nitrogen-containing substances having an ethylenically unsaturated polymerizable group.

Various well-known polymeric amines are suitable for the preparation of salts of the present invention. They may be simple polymers, such as those obtained by polymerizing vinyl substituted basic heterocyclic nitrogen-containing substances such as vinyl pyridine, vinyl picoline and vinyl quinoline or vinyl arylamines such as paraaminostyrene, or polyamines prepared by reducing, in the presence of ammonia or primary or secondary amines, the polymerized acrylates and methacrylates of hydroxyalkyl tertiary amines, and the polymeric amines obtained by reacting polymers containing epoxy groups with ammonia or primary or secondary amines. The preferred polymeric amine compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals such as are described in British patent specification 760,544 and U.S. Patents 2,839,512 and 2,889,282. The copolymers include copolymer of stearyl methacrylate and 2-methyl-5-vinyl pyridine, copolymer of stearyl methacrylate, lauryl methacrylate and 2-methyl-5-vinyl pyridine, and those which contain additional $C_{1-4}$ alkyl methacrylates in the polymer also such as copolymer of stearyl methacrylate, lauryl methacrylate, methyl methacrylate and 2-methyl-5-vinyl pyridine, and similar copolymers in which the methyl methacrylate is replaced by butyl methacrylate and the 2-methyl-5-vinyl pyridine is replaced by 5-ethyl-2-vinyl pyridine and mixtures thereof. Other suitable polymeric amines are those available commercially such as those sold by E. I. du Pont de Nemours and Co. under the names LOA 564 and 565, and which are lauryl methacrylate/diethyl-aminoethylmethacrylate copolymers.

The N-hydrocarbyl carbamic acids used to form the salts of this invention are those represented by the above-formula

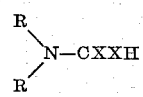

and preferably N,N-substituted dithiocarbamic acid and particularly $C_{1-12}$ alkyl or aralkyl aryl or cycloalkyl dithiocarbamic acid. Typical of such acids are N-hydrocarbyl carbamic, thiocarbamic and dithiocarbamic acids, e.g., N-alkyl, N-aralkyl, N-aryl and N-cycloalkyl as well as N,N-alkyl, N,N-aralkyl, N,N-aryl and N,N-cycloalkyl derivatives of said acids. The N-alkyl derivatives of said acids include N-$C_{1-12}$ alkyl, e.g., N-methyl, N-ethyl, N-butyl, N-pentyl, N-hexyl, N-propyl, N-heptyl, and N-octyl; carbamic thiocarbamic and dithiocarbamic acids, the aralkyl derivatives include N-benzyl, N-ethylbenzene, N-propylbenzene, carbamic, thiocarbamic and dithiocarbamic acids; N-aryl derivatives include N-phenyl-, N-naphthyl-, N-phenyl-alpha-naphthyl-, N-phenyl-beta-napthyl carbamic, thiocarbamic and dithiocarbamic acids; N-cyclohexyl derivatives include N-cyclopentyl-, N-cyclohexyl-, N-cycloheptyl carbamic, thiocarbarmic and dithiocarbamic acids. The N,N-hydrocarbyl derivatives include N,N-dimethyl-, N,N-diethyl-, N,N-dibutyl-, N,N-dihexyl-, N,N-diheptyl-, N,N-dioctyl-, N,N-dinonyl-, N-butyl-, N-octyl; N,N-dibenzyl, N,N-diphenyl, N,N-dicyclohexyl-, N,N-dicycloheptyl carbamic, thiocarbamic and dithiocarbamic acids.

The N,N-disubstituted carbamic acids may optionally contain mixed hydrocarbon substituents, i.e., N-alkyl N-aryl carbamic, thiocarbamic or dithiocarbamic acids, for example, N-ethyl N-phenyl dithiocarbamic acids, N-butyl N-phenyl dithiocarbamic acid, and N-propyl N-naphthyl dithiocarbamic acids; N-alkyl N-cycloalkyl dithiocarbamic acids, for example, N-butyl N-cyclopentyl dithiocarbamic acid, N-isobutyl N-cyclohexyl dithiocarbamic acid and N-octyl N-cyclopentyl dithiocarbamic acid; N-alkyl N-aralkyl dithiocarbamic acids, for example, N-propyl N-benzyl dithiocarbamic acid, N-isobutyl N-ethylbenzene dithiocarbamic acid, N-octyl N-octyl N-benzyl dithiocarbamic acid; N-aralkyl N-aryl dithiocarbamic acids, for example, N-cyclopentyl N-phenyl dithiocarbamic acid; N-aralkyl N-cycloalkyl dithiocarbamic acids, for example N-benzyl N-cyclopentyl dithiocarbamic acid; and N-aryl N-cycloalkyl dithiocarbamic acids, for example, N-phenyl N-cyclohexyl dithiocarbamic acid.

The aryl and aralkyl carbamic, thiocarbamic or dithiocarbamic acids may optionally be substituted in the aromatic nucleus by, for example, halogen, sulfonic acid, phosphinic acid, phosphorus acid and hydrocarbon groups.

The N-hydrocarbyl carbamic acids may be made by any of the known methods, for example, the dithiocarbamic acids can be made by the interaction of a primary of secondary amine with carbon disulfide in a suitable solvent.

In some instances the free carbamic acids are unstable, and in those cases the acids can be converted to alkali metal salts of these carbamic acids and used in the manufacture of the polymeric amine salts according to the invention as hereinafter described. The alkali metal salts of these carbamic acids, preferably dithiocarbamic acids may be prepared by the interaction of the corresponding amine with carbon disulfide in the presence of aqueous alkali.

The salts of this invention may be prepared by any of the conventional methods for preparing salts of organic amines and organic acids. Thus, the polymeric amine may be dissolved in an organic solvent, such as benzene or xylene, and the acid added to the solution with agitation. The acid itself may, of course, be dissolved in a suitable solvent. Alternatively, the polymeric amine may be suspended in a suitable liquid medium and the acid stirred into the suspension. When using these methods, it may be necessary to isolate the salt by removing the solvent or suspending medium before the salt is added to the lubricating oil. Simpler methods, such as merely adding the acid to the melted polymeric amine, are also suitable on occasion. Also the acid and the polymeric amine may be added to the lubricating oil to allow salt formation in situ.

It is often convenient to manufacture the salts of the present invention by the interaction of a salt of the oil-soluble polymeric amine with a metal, amine or ammonium salt of the carbamic acid, e.g., dithiocarbamic acid. As salts of the oil-soluble polymeric amines there may be used, for example, the hydrochloride, hydrobromide, carbonate, acetate or sulphate salts, and as metal salts of the said carbamic acids there may be used, for example, the potassium sodium, calcium, barium, magnesium, mercury or zinc salts. It is preferred, however, to choose a salt of the oil-soluble polymeric amine and a metal salt of the dithiocarbamic acid such that the inorganic metal salt so formed by double decomposition is insoluble in the resulting oil-soluble polymeric amine dithiocarbamate and in the solvent, as it is thereby more readily removed; for example, by filtration.

A typical process comprises dissolving the salt of the oil-soluble polymeric amine in an inert solvent, e.g., benzene, and adding to the solution, with stirring, a solution of the metal salt of the dithiocarbamic acid in the same solvent. A precipitate of the inorganic metal salt is formed by double decomposition which is removed by filtration and the salt of the oil-soluble polymeric amine and the dithiocarbamic acid is then isolated by distilling off the solvent, preferably under reduced pressure.

It is not essential that all the basic nitrogen groups in the polymer be neutralized by the acid. In fact, better results may be obtained when the final product contains some unneutralized basic nitrogen atoms. To leave some unneutralized basic nitrogen atoms may be desirable if the salt is required to act as a detergent additive as well as a viscosity index improver.

The basic nitrogen-containing polymeric salts of N-hydrocarbyl carbamic acids used in oil compositions of the present invention are novel salts and form one feature of the present invention. Of this class of novel salts, those preferred which are derived from copolymers having a molecular weight of from about 75,000 to about 1,000,000 and derived from a vinyl pyridine and an ester of an acrylic acid in which the acrylic acid moiety has no more than 5 carbon atoms. Preferably the copolymer is one in which the molar ratio of polymerizable nitrogen base compound to polymerizable unsaturated material free of heterocyclic nitrogen-containing radicals in the copolymer is from about 1:1 to about 1:4.

The following examples illustrate the preparation of the novel salts provided by the present invention. In these examples, the parts referred to are parts by weight unless otherwise specified.

*Example I*

A mixture comprising 30.9 parts of lauryl methacrylate, 23.4 parts of stearyl methacrylate, 9 parts by weight of methyl methacrylate, 2.5 parts of 2-methyl-5-vinyl pyridine, 12.5 parts of benzene and 12.5 parts 100 neutral HVI oil is heated to 120° C. A 5% solution of di-t-butyl peroxide in the above mixture is added over a short period of time and polymerization commences after an induction period of about one hour. At the commencement of the polymerization 2-methyl-5-vinyl-pyridine is added at such a rate as to maintain a constant 2-methyl-5-vinyl pyridine/methacrylate molar ratio of 0.069/1. The quantity of 2-methyl-5-vinyl pyridine added during the polymerization is approximately equal to the amount charged initially. At the end of the polymerization additional 100 neutral HVI oil is added and the benzene removed by steam stripping to yield a concentrate containing about 30% of polymer.

315 parts of this concentrate are dissolved in benzene and a slight excess of hydrochloric acid (based on the nitrogen content) is added. The mixture is refluxed under a Dean and Stark head until no more water separates. To the resulting benzene solution a solution of 3.4 parts by weight of the potassium dibutyl dithiocarbamate in 80 parts by weight of benzene is added. The filtrate is distilled under reduced pressure to remove the benzene and the residue is a concentrate of the polymeric amine in the 100 neutral HVI oil.

*Example II*

A polymeric amine is prepared by copolymerizing 3900 parts of lauryl methacrylate and 228 parts of 2-methyl-5-vinyl pyridine by the process described in Example I. The product is obtained as a 50% concentrate in 100 neutral HVI oil. To this concentrate, benzene and a slight excess of HCl are added to form the hydrochloride. After removal of water, 6.15 parts of potassium dibutyl dithiocarbamate in benzene are added and the preparation completed as in Example I. The product is obtained as a concentrate in 100 neutral HVI oil.

*Example III*

To 110.5 parts of a concentrate of the hydrochloride salt of the polymer prepared as in Example I, 250 parts of benzene and 5.3 parts of potassium N,N-di(2-ethylhexyl)dithiocarbamate in 100 parts of benzene are added. The precipitated potassium chloride is removed by filtration and the benzene removed by distillation under reduced pressure. The product is obtained as a concentrate in 100 neutral HVI oil.

*Example IV*

31 parts of a polymeric amine containing 0.22 meq. basic nitrogen per gram marketed by Du Pont as LOA 564 (lauryl methacrylate/diethylamino ethyl methyl methacrylate copolymer) are dissolved in 200 parts of benzene and converted to the hydrochloride by adding a theoretical amount of hydrogen chloride. A solution of 3.1 parts of potassium N,N-di(2-ethylhexyl) dithiocarbamate in 100 parts of benzene are added and the precipitated potassium chloride filtered off. The benzene is removed by distillation under vacuum. The product obtained is the N,N-di-(2-ethylhexyl) dithiocarbamate salt of the polymeric amine.

Other examples of additives of this invention include:

V. Oil-soluble salt of lauryl methacrylate/2-methyl-5-vinylpyridine copolymer and N,N-dibutylcarbamic acid, VI. Oil-soluble salt of stearylmethacrylate/p-aminostyrene copolymer and N-butyl dithiocarbamic acid, VII. Oil-soluble salt of vinyl quinoline/stearyl methacrylate copolymer and N-benzyl dithiocarbamic acid, VIII. Oil-soluble salt of copolymer of lauryl methacrylate/stearyl methacrylate/methyl methacrylate/2-methyl-5-vinylpyridine and N,N-dicyclohexyl dithiocarbamic acid, IX. Oil-soluble salt of copolymer of lauryl methacrylate/stearyl methacrylate/methyl methacrylate/2-methyl-5-vinylpyridine and N,N-dithiocarbamic acid, X. Oil-soluble salt of allylamine/stearyl methacrylate copolymer and N,N-dibutylmonothiocarbamic acid.

The polymeric salts when added to lubricating oils produce an outstanding lubricant. The lubricating oil can be any natural or synthetic oil having lubricating properties. Thus, the oil may be of hydrocarbon lubricating oil obtained from a paraffinic or naphthenic crude or a mixture thereof. The viscosity of these oils may vary over a wide range, such as from 60 SUS at 100° F. to 50 SUS at 210° F. The hydrocarbon lubricating oils may be blended with fatty oils, such as castor oil or lard oil, and/or with synthetic lubricating oils, such as polymerized olefins, copolymers of alkylene glycols and alkylene glycols and alkylene oxides, organic esters, such as di(2-ethylhexyl) sebacate, dioctyl phthalate and trioctyl phosphate, polymeric tetrahydrofurane, and polyalkyl silicone polymers, such as dimethyl silicone polymers. The synthetic lubricating oils, such as polymeric hydrocarbons or the polar containing compounds may be used as the sole base lubricating oil or admixed with fatty oils and derivatives thereof. In formulating multigrade lubricants light oils of a viscosity range of 60 to 150 SUS at 100° F. are preferred of which light mineral oils of 75 to 100 SUS at 100° F. are specifically useful. For single grade lubricants higher viscosity oils are prepared.

Lubricating compositions of the invention are illustrated by the following formulations:

Composition A:
 Concentrate of salt according
  to Example I _____ 13.3% by wt.
 A mineral lubricating oil having
  a viscosity of 55 seconds,
  Redwood I at 210° F. _____ Essentially balance.

Composition B:
 Concentrate of salt according
  to Example II _____ 8% by weight.
 A mineral lubricating
  a viscosity of 75 seconds,
  Redwood I at 140° F. _____ Essentially balance.

Composition C:
 Concentrate of salt according
  to Example III _____ 14.5% by weight.
 A mineral lubricating oil
  having a viscosity of 75 seconds, Redwood I at 140° F.___ Essentially balance.

Composition D.
 The salt of Example VI _____ 4% by weight.
 Mineral lubricating oil
  (75/100° F. SUS) _____ Essentially balance.

Composition E:
 The salt of Example III _____ 5% by weight.
 Mineral lubricating oil
  (75/100° F. SUS) _____ Essentially balance.

Composition F:
 The salt of Example II _____ 3% by weight.
 Zn dicyclohexyl thiophosphate _ 0.82% by weight.
 Mineral lubricating oil
  (75/100° F. SUS) _____ Essentially balance.

Composition G:
 The salt of Example X _____ 4% by weight.
 Zn diamyl dithiocarbamate ____ 0.5% by weight.
 Mineral lubricating oil
  (100/100° F. SUS) _____ Essentially balance.

Composition H:
 The salt of Example I _____ 3% by weight.
 Tricresyl phosphate _____ 0.5% by weight.
 4,4'-methylene bis(2,6-
  diterbutyl phenol) _____ 0.75% by weight.
 Mineral lubricating oil _____ Essentially balance.

Composition I:
 The salt of Example I _____ 3% by weight.
 Tricresyl phosphate _____ 0.5% by weight.
 Dicresyl phosphate _____ 0.2% by weight.
 4,4'methylene bis(2,6-
  diterbutyl phenol) _____ 0.75% by weight.
 Mineral lubricating oil _____ Essentially balance.

For comparative purposes the following formulation was made.

Composition X:
 Concentrate of polymeric
  amine use in Example I _____ 4% by weight.
 A mineral lubricating oil having
  a viscosity of 55 seconds,
  Redwood I at 210° F. _____ Balance.

In order to illustrate the anti-oxidant properties of the salts according to the invention, Compositions A and D and the base oil were subjected to an anti-oxidant test in a Dornte Oxidation Apparatus using copper stearate as catalyst according to the process described in Disc. Far. Soc. 1951, 10, 298. The following results shown in Table I were obtained:

| Composition: | Time taken to absorb 200 ml. of oxygen per 100 g. of oil, minutes |
|---|---|
| Base oil | 30 |
| Composition X | 2 |
| Mineral oil (55 sec. Redwood I at 210° F.) +13.3% wt. conc. of salt of copolymer of Ex. I and dimonyl phosphate | 60 |
| Mineral oil (55 sec. Redwood I at 210° F.) + 13.3% wt. conc. of salt of copolymer of Ex. I and octadecyl sulfonate | 30 |
| Composition A | 525 |

With compositions B to I comparable oxidation stabilizing effects to Composition A can be expected when these compositions are tested in the Dornte Oxidation Apparatus under conditions described above.

In their use the present products may also be combined with other additives such as anti-oxidants, pour point depressants viscosity index improvers, corrosion inhibitors, wear-inhibitors, peptizing agents, anti-foaming agents, extreme-pressure and oiliness agents and other materials generally added to lubricants.

This patent application is a continuation-in-part of copending case Serial No. 16,637, filed March 22, 1960.

We claim as our invention:

1. An oil-soluble salt of a polymeric amine selected from the group consisting of poly (vinyl pyridine), poly-(vinyl picoline), poly(vinyl quinoline), and poly(para-amino styrene), and N-hydrocarbyl $C_{1-12}$ carbamic acid, said polymeric amine salt having a molecular weight of from 75,000 to 1,000,000.

2. An oil-soluble salt of a copolymer of vinylpyridine and an acrylate ester in the mole ratio of about 1:4, respectively and having a molecular weight from 75,000 to 1,000,000, and a $C_{1-12}$ N-alkyl thiocarbamic acid.

3. An oil-soluble salt of a copolymer of a vinyl pyridine and an acrylate ester in the mol ratio of about 1:4, respectively and having a molecular weight of from 75,000 to 1,000,000 and a N-$C_{1-12}$/hydrocarbyl thiocarbamic acid.

4. An oil-soluble salt of a copolymer of a vinyl pyridine and an acrylate ester in the mol ratio of about 1:4, respectively and having a molecular weight of from 75,000 to 1,000,000 and a N-$C_{1-12}$ dialkyl thiocarbamic acid.

5. An oil-soluble salt of copolymer of stearyl methacrylate, lauryl methacrylate (and 2-methyl-5-vinylpyridine) in the mole ratio of 4:1 respectively and having a molecular weight of from 75,000 to 1,000,000 and di-2-ethylhexyldithiocarbamic acid.

6. An oil-soluble salt of copolymer of stearyl methacrylate, lauryl methacrylate (and 2-methyl-5-vinylpyridine) in the mole ratio of 4:1, respectively and having a molecular weight of from 75,000 to 1,000,000 and di-2-ethylhexyldithiocarbamic acid.

7. An oil-soluble salt of copolymer of lauryl methacrylate and diethyl aminoethyl methacrylate in the mol ratio of 4:1, respectively and having a molecular weight of from 75,000 to 1,000,000 and dibutyldithiocarbamic acid.

8. An oil-soluble salt copolymer of lauryl methacrylate and diethyl aminoethyl methacrylate in the mol ratio of 4:1, respectively and having a molecular weight of from 75,000 to 1,000,000 and di-2-ethylhexyl dithiocarbamic acid.

No References Cited.

JOSEPH L. SCHOFER, *Primary Examiner.*